(12) United States Patent
Lin et al.

(10) Patent No.: US 10,611,928 B2
(45) Date of Patent: Apr. 7, 2020

(54) AQUEOUS DISPERSIONS COMPRISING POLYURETHANE AND ETHYLENIC COPOLYMERS FOR HEAT SEALABLE COATINGS

(71) Applicant: Actega North America, Inc., Delran, NJ (US)

(72) Inventors: Anshyang Lin, Mt. Laurel, NJ (US); Rahul V. Agnihotri, Maple Shade, NJ (US); George C. Beetz, Delran, NJ (US)

(73) Assignee: ACTEGA NORTH AMERICA, INC., Delran, NJ (US)

( * ) Notice: Subject to any disclaimer, the term of this patent is extended or adjusted under 35 U.S.C. 154(b) by 139 days.

(21) Appl. No.: 15/750,558

(22) PCT Filed: Aug. 5, 2016

(86) PCT No.: PCT/US2016/045735
§ 371 (c)(1),
(2) Date: Feb. 6, 2018

(87) PCT Pub. No.: WO2017/024211
PCT Pub. Date: Feb. 9, 2017

(65) Prior Publication Data
US 2019/0010362 A1 Jan. 10, 2019

Related U.S. Application Data

(60) Provisional application No. 62/201,726, filed on Aug. 6, 2015.

(51) Int. Cl.
| | | |
|---|---|---|
| C09D 175/04 | (2006.01) |
| C09J 175/04 | (2006.01) |
| C09J 5/06 | (2006.01) |
| C09J 11/06 | (2006.01) |
| C09J 133/06 | (2006.01) |
| C09D 133/08 | (2006.01) |
| C09D 7/65 | (2018.01) |
| B65D 75/36 | (2006.01) |
| C09D 5/26 | (2006.01) |
| C09D 123/08 | (2006.01) |
| C09J 11/08 | (2006.01) |
| C09J 123/08 | (2006.01) |

(52) U.S. Cl.
CPC .............. *C09J 5/06* (2013.01); *B65D 75/36* (2013.01); *C09D 5/26* (2013.01); *C09D 7/65* (2018.01); *C09D 123/0838* (2013.01); *C09D 133/08* (2013.01); *C09D 175/04* (2013.01); *C09J 11/06* (2013.01); *C09J 11/08* (2013.01); *C09J 123/0838* (2013.01); *C09J 133/06* (2013.01); *C09J 175/04* (2013.01); *C09J 2423/04* (2013.01); *C09J 2475/00* (2013.01); *C09J 2491/00* (2013.01)

(58) Field of Classification Search
None
See application file for complete search history.

(56) References Cited

U.S. PATENT DOCUMENTS

| | | |
|---|---|---|
| 2003/0050347 A1 | 3/2003 | Faust et al. |
| 2003/0148110 A1 | 8/2003 | Holbert et al. |
| 2004/0208911 A1 | 10/2004 | Ratnakumar et al. |
| 2007/0087189 A1 | 4/2007 | Cooper |
| 2013/0143010 A1* | 6/2013 | Buchner ............ C08G 18/0828 428/200 |

* cited by examiner

*Primary Examiner* — Richard A Huhn
(74) *Attorney, Agent, or Firm* — Ladas & Parry LLP

(57) ABSTRACT

A film forming aqueous dispersion having utility as heat seal coatings for blister packaging applications comprises a blend of 10-90% by weight of one or more polyurethane dispersions; 90-10% by weight one or more compatible ethylenic copolymer dispersions/emulsions; an anti-blocking additive at 0.1-12 weight % of the total solids; and optional additives including wetting, defoaming, thickener, antifungal additives. The heat seal coating compositions provide enhanced and balanced properties such as a reduction of organic solvents, a tack free coating surface off the press, good press runnability, easy clean-up, antiblocking from ambient temperature to 50° C., heat-activation with no pot life at elevated temperatures, and, heat sealability to various plastic substrates including Virgin Poly(ethylene terephthalate) (PET), recycle PET (RPET), Amorphous PET (APET), PET-Glycol modified (PETG), PETG/APET/PETG (GAG) and Polyvinyl chloride (PVC).

10 Claims, 1 Drawing Sheet

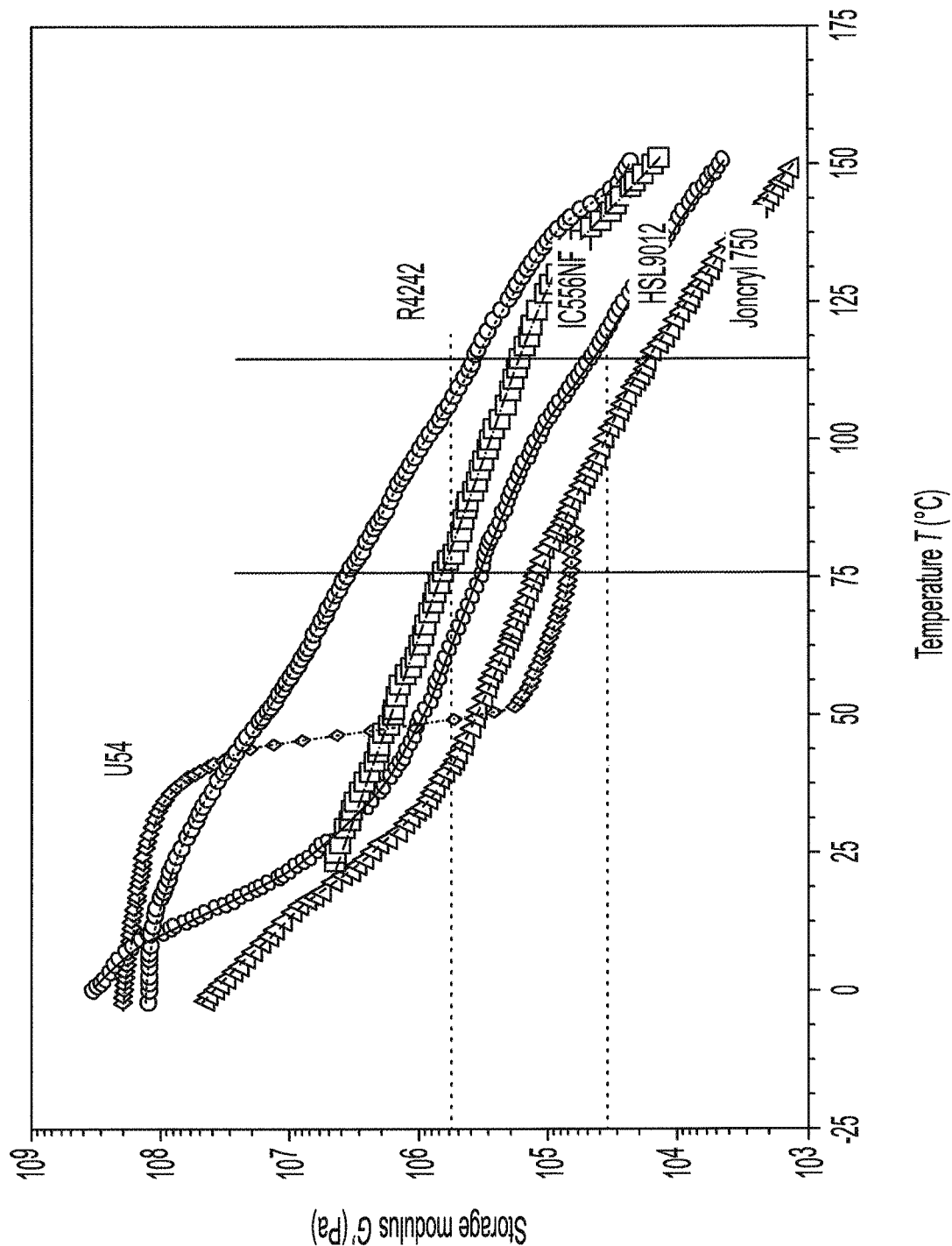

AQUEOUS DISPERSIONS COMPRISING POLYURETHANE AND ETHYLENIC COPOLYMERS FOR HEAT SEALABLE COATINGS

FIELD OF THE INVENTION

The present invention relates to waterborne dispersion coating compositions having utility as heat seal coatings for blister packaging and particularly to such compositions that exhibit improved heat sealability to various plastic substrates including virgin poly(ethylene terephthalate) (PET), recycled PET (RPET), amorphous PET (APET), PET-glycol modified (PETG), PETG/APET/PETG (GAG) and polyvinyl chloride (PVC).

BACKGROUND OF THE INVENTION

Blister packs are well known and widely used for packaging of various commercial products such as tools, batteries, toys, and products from pharmaceutical markets. The packages are commonly referred to as "visual packaging" where at least one side of the package is made of a transparent and formed plastic material (a "blister") to house the packaged articles and thereby allowing the customer to see the products inside the package. The blister is commonly bonded to a sheet-like substrate (backing) coated with a heat seal coating to enclose the packaged articles in a separate step. Paperboard, when employed as the backing material and carrier of printed information, is referred to as blister board. US 2006/0246262 A1, US 2003/0148110 A1, and US2003/0196925A1 describe requirements for, and improvements to, blister boards. The heat seal coatings are applied by roller coaters or flexo coaters from flexo or offset presses onto the sheet-like substrate in sheet-fed or roll-fed operations. In the heat sealing step, the heat seal coated backing and the plastic blister are pressed together by means of a heated sealing jar.

Since the application of the heat seal coatings and the bonding of the blister are carried out in different operations, a heat seal coating must in some cases meet contradictory requirements as outlined below.

The printed and coated substrates or paperboards (blister cards) must be able to be stacked without sticking together (blocking) during stacking, storage, die-cutting, and transportation in temperatures from ambient to 50° C. Block resistance up to 50° C. under pressure is essential so that the printed and coated sheets can be transported to and processed at the packing and sealing line. During the sealing process, the coating will be activated to behave like an adhesive at an elevated temperature and bond to the blister plastic. It is important that the activation temperature be not high enough to melt the blister plastic. Thus, the desired activation temperature is typically in the range of 170° F. to 240° F. (76° C. to 116° C.). Because of the dual function of coating and having adhesive properties at different temperature ranges, the heat seal compositions are referred to either as heat seal coatings or as heat seal adhesives. The term "heat seal coatings" shall be used herein to describe both heat seal coatings and heat seal adhesives. It is of great importance that the blister packs also provide visual evidence (such as fiber tearing of the paperboard backing) of any unauthorized or unintentional entry into the blister pack, and that they do not rupture under conditions such as shipping, handling or stocking or being dropped on the floor. The heat seal coatings have to provide a strong enough bond to provide for such substrate tearing, such as fiber tearing for a paper board backing, and must be resistant to high moisture levels that may be present during transportation, storage, and store handling periods.

Due to its negative impact on environment, PVC, once the primary plastic for blister use, is intentionally avoided nowadays. Virgin PET, APET, recycled PET (RPET), PETG, and GAG have become the blister materials of choice for many brand owners. However, adhesion of the heat seal coating to these new plastics is difficult, especially for waterborne and solvent borne heat seal coatings alike. For environmental sustainability, the use of a recycled material like RPET is desired, but such materials are especially challenging to achieve good fiber tearing seal performance.

Solvent based blister coatings have been used for blister packs for many decades and still are being used by small number of converters, but it is desirable to provide a functional waterborne heat seal coatings for environmental reasons. Many converters use offset presses to apply both inks and coatings in-line, where there is only a moderate drying capability. Waterborne heat seal coatings have to dry quickly on such lines without reducing press speed, and must provide good press runnability and ease of cleaning. In addition, waterborne heat seal coatings have to meet all the requirements mentioned above.

Currently there are two aqueous chemistries being used in the marketplace for blister heat seal applications, namely polyurethane dispersions and acrylic emulsion/dispersions. Polyurethane dispersion systems, in general, may have good heat seal adhesion to various blister plastic mentioned above. However, they suffer from major drawbacks of having a tacky coated surface, requiring a slower line speed, having extensive/difficult cleanup procedures, and having a high cost. The convertors have employed many tactics to address the blocking related issues, such as applying offset (starch) powders, stacking in short piles, and packing vertically to minimize the stacking pressure. Aggressive solvents and frequent ultrasonic deep cleaning for anilox rollers have to be employed for cleaning and maintaining consistent coat weight. Due to the roller clogging and surface tack issues their press runnability suffers.

Acrylic systems, on the other hand, have good press runnability but have very limited heal seal adhesion to non-PVC blisters, especially virgin PET, APET, and RPET, causing many package failures during transportation, cold storage conditions, and in the stores.

U.S. Pat. No. 5,385,967 and EP 0798357B1 disclose aqueous dispersions for heat seal applications with a first copolymer having a glass transition (Tg) of 50 to 150° C. and a second copolymer with a glass transition of −50 to 50° C. with the Tg of the two polymers differing by 20° C.; at least one of the copolymers contains 3 to 70% by weight of an acrylic ester unsaturated C3-C5 mono- or di-carboxylic acid or anhydrides thereof. The recited examples generally show a high glass transition temperature (Tg) copolymer with high amount of amount of C3-C5 mono- or di-carboxylic acid or anhydrides thereof. Such high Tg polymers with a high amount of carboxylic resins are generally known as support resins and, while having good colloidal stability, tend to impart unacceptable moisture sensitivity in applications where exposure to moisture occurs. Both aqueous copolymers are ethylenic copolymers and do not contain any polyurethane dispersion or wax, the block resistance is only presented at 40° C., and the heat seal is only shown with PVC, PS (polystyrene), PET and not the more difficult RPET blister.

U.S. Pat. No. 5,800,873 relates to a process for producing sealed packaging containers from plastic films, comprising the step of applying to the plastic film a sealing coating based on an aqueous dispersion or solution of acrylate copolymer which is prepared by emulsion polymerization of alkyl ester of acrylic acid and methacrylic acid and α,β-ethylenically unsaturated carboxylic acids, wherein the aqueous dispersion or solution is prepared by a 2-stage emulsion polymerization. The Tg of the copolymer is not more than 50° C. The patent further describes that the film has to be pretreated with an oxidizing agent (such as chromic acid or a chlorination, hot air, steam, or flame or corona treatment) or pre-coated with a primer (such as alkyl titanates and polyethyleneimines) to ensure adhesion. The sealing temperature is in the range of 20° to 80° C., and particularly 40° to 80° C., which is too close to the 50° C. block resistance temperature required for blister heat seal.

WO 2011/017388A2 relates to a heat seal adhesive composition for plastic and metal containers, and also includes only ethylenic copolymers; 50 to 75% by weight of soft acrylate copolymers having a Tg from 0 to 60° C., containing only 0.2-10 weight % of C3-C10 ethylenic unsaturated mono- or dicarboxylic acids or its anhydrides and 25-50% by weight of hard acrylate copolymers having a Tg from 50 to 120° C., containing up to 10% of C3-C10 ethylenic unsaturated mono- or dicarboxylic acids or their anhydrides. This approach is similar to that disclosed in WO 2011/017388A2 mentioned above, only with a less acidic moiety. It utilizes a hard acrylic copolymer to improve block resistance, and does not contain polyurethane dispersion or wax. The heat seal activation temperature is 120 to 175° C., which is close to the softening or melting point of some of the plastics in considerations, resulting in a long heat seal time; a heat seal test is disclosed as only conducted with adhesive coated aluminized polyester and polystyrene (PS); adhesion to recycled PET is not mentioned.

WO 2001077246A1 discloses a low temperature thermally activated water dispersed adhesive compositions made from low modulus crystallizing polyester polyurethane, acrylic ester copolymer, one or more hydrophobic modified associated polyurethanes, and a stabilizer comprising a combination of carbodiimide and a branched primary amino alcohol. Even though the composition is heat sealable and defines its adhesive behavior with a modulus from dynamic mechanical properties, it has an open time limitation, beyond which it is not heat sealable. It is designed specifically for bonding fabric to foam for automotive and office seating; no blister plastics as mentioned above are identified; the bond line temperature for the heat seal is at 43° C., which would create a blocking issue in blister applications. The stability of the blend has to be stabilized by an associative thickener and a combination of carbodiimides and a branched primary amino alcohol.

U.S. Pat. No. 6,924,366 B2 teaches a polymer dispersion for heat seal lamination useful for glass fiber sizing, comprising a water continuous phase, dispersed particles of polyurethane, (non-aromatic, with a melting point of 25 to 70° C.); and a copolymer and/or terpolymers having a Tg between −20 and 50° C., emulsion polymerized in the presence of a polyurethane dispersion (termed a "Hybrid" polymer blend). It is used as heat seal lamination adhesive between MDF wood and PVC, and requires 1 hour drying at room temperature, which is too long for a blister coating application. The reported blocking test was conducted by a finger tack without any pressure, which is not sufficient for blister application where coated sheets are stack in a pile under high pressure. The bond performance also requires 24 hours to develop, which is not practical for blister packaging processes.

U.S. Pat. No. 8,653,180B2 provides a composition with early hardness development comprising a blend of one or more emulsion vinyl copolymers having a Tg of 20° C. or higher, one or more polyurethane copolymers in aqueous dispersion, and one or more additives chosen from coalescing solvents with boiling points from 150 to 300° C. and naturally derived plasticizers. The composition enhances hardness development and reduces VOC (volatile organic compounds) compared to solvent based systems, but, a high boiling point solvent required for fast hardness development will need extreme heat for its removal, and no heat sealability is mentioned.

A dry blond laminating adhesive is mentioned in U.S. Pat. No. 6,248,815 B1 to offer improved bonded properties of flexible film substrates such as polyolefins, polyesters, polyamides, cellophanes, metals and papers. The composition comprises at least one aqueous vinyl polymer dispersion, at least one water dispersible polyfunctional aziridine, and optionally at least one polyurethane polymer dispersion. The adhesive does requires 3 days to cure to the bond strength, which is not desirable for blister application with an immediate fiber tearing bond requirement, and it contains a hazardous aziridine crosslinker.

U.S. Pat. No. 8,637,609 B1 relates to blends of 40-60 wt % of acrylic silane polymers and 60-40 wt % of a polyurethane/acrylic hybrid dispersion for use on a plastic or metal substrate. However, there is no specific recitation of heat seal properties, and no other specific application is mentioned. CA 2086209A1 utilizes a similar acrylic silane polymer and polyurethane for automotive finishes and is not heat sealable.

WO1994005738A1, EP 0656926 B1 and CA2140938C provide a book binding primer and adhesive composition comprising a) an aqueous vehicle, b) 1-90% of a polymeric plastic film-forming resin comprising an ethylene-vinyl acetate copolymer, a styrene butadiene rubber, an acrylic resin, an acetate butyl maleate copolymer or a mixture thereof, c) 10-99% of a polyurethane resin comprising a hindered aliphatic or aromatic-aliphatic polyurethane resin and crosslinkable. The booking binding adhesive composition provides use as primer, with asserted shape retention, excellent bond strength, and acceptable drying characteristics due to the blend. However, there is no mention of heat sealability, plastic adhesion or use in blister applications.

U.S. Pat. No. 5,548,016 teaches a primer composition for a flexible plastic substrate that includes a blend of 10-30% resin (80-90 wt % of acrylic and 10-20 wt % of urethane resins), 20-30% pigments, 10-25% water dispersible fast drying coalescing solvent, and water. The resin blend provides adhesion to thermal-plastic olefin (TPO) and sheet molded compounds (SMC). No heat seal property is mentioned and the fast drying properties is based on high percentage of fast drying coalescing solvents in the system. U.S. Pat. No. 5,006,413 provides an asserted good water borne alternative to solvent based systems for after-market finishing repair, and features use of an acrylamide-acrylic copolymer with polyurethane or polyacrylo-urethane. It is designed for coating only and not for heat sealing. US 2015/0045491 A1 and WO2013139019A1 utilize polyurethane/acrylic hybrid dispersions ("chemical" blends) containing acidic monomers to achieve a high pigment volume concentration (PVC) roof coating (high binder affinity) and a lower raw material cost. CN103360561 B discloses a hybrid preparation method to make a polyurethane modified acrylic emulsion to improve the compatibility between the originally two incompatible polymers to form an interpenetrating network. This chemical blending is claimed to provide better transparency, molecular mixability, hardness, and other superior properties for artificial stones. No heat seal property is mentioned.

U.S. Pat. No. 4,654,397 teaches the preparation of an acrylic copolymer dispersion with low film formation temperature but still yielding films having good block resistance. The dispersion is prepared through a multistage polymerization process, and comprises A) 75-98% of a monomer yielding a homopolymer with a Tg from −72 to 0° C., B) 2-25% of a monomer yielding a homopolymer with a Tg 80 to 140° C., C) 0-10% carboxyl or carboxamide monomer, and D) a monomer with an effect on crosslinking. The anti-blocking property comes from controlling the amounts of high Tg monomer, acidic monomer and crosslinking monomer without using wax, while the soft monomer provide the low temperature film forming characteristics. However, specific adhesion to plastics and heat sealability is not mentioned.

U.S. Pat. No. 5,756,170 relates to a packaging film coated with polyurethane which bears hydrophilic groups which makes it water dispersible and has a melting from 20 to 70° C. with an enthalpy of fusion at least 20 J/g. The specified composition which was tested for its blocking resistance at ambient temperature and humidity only, is asserted to seal well to oriented polypropylene (OPP) film at 50° C., which is the block resistant temperature for blister applications, and no other plastics are mentioned. It also requires a 2 part polyurethane primer on OPP. The specific components (isocyanates and polyols) used to prepared the polyurethane dispersion are too soft and can only be used for cold seal adhesive type applications.

None of the above mentioned prior art address all the market requirements for blister heal seal coatings, which include the ability to heat seal to various blister plastics (RPET, APET, virgin PET, PETG, GAG, PVC), tack free coating surface off the press, good press runnability with easy clean-up, good block resistance, a proper heat activation temperature per blister coating applications, and low VOC contents. There remains a need in the marketplace for a waterborne/aqueous heat seal coating that meets all the requirements mentioned above.

BRIEF SUMMARY OF THE INVENTION

The present invention provides a waterborne dispersion coating composition having utility as heat seal coating for blister packaging applications, preferably comprising: A) 10% to 90% by weight of one or more polyurethane dispersions; B) 90% to 10% by weight of one or more compatible ethylenic copolymer dispersion/emulsions, C) an anti-blocking additive at 0.1-12 weight % of the total solid; and optional additives, including wetting, defoaming, thickening and antifungal additives; and that the shear storage modulus, G', of the dried film at heat seal activation temperature range (from 170° F. to 240° F.) is tailored to be in the range of $3.5 \times 10^4$ to $6 \times 10^5$ Pascals. The weight ratio between A and B, based on the solid resins, is in the range of 15/85 to 85/15. The heat seal coating compositions of the invention provide enhanced and balanced properties such as a reduction of organic solvents, a tack free coating surface off the press, good press runnability, easy clean-up, anti-blocking from ambient temperature to 50° C., heat-activation with no pot life at elevated temperature, and heat sealability to various plastic substrates including virgin poly(ethylene terephthalate) (PET), recycled PET (RPET), amorphous PET (APET), PET-Glycol modified (PETG), PETG/APET/PETG (GAG) and polyvinyl chloride (PVC).

BRIEF DESCRIPTION OF THE DRAWING

The annexed FIGURE is a plot of shear storage modulus for five different dispersions over a temperature range of 0° to 150° C.

DETAILED DESCRIPTION OF THE INVENTION

The unique advantages of polyurethane dispersions in relation to coatings are their ability to form a coherent film, generally having good adhesion to plastic substrate, and the ease of property (such as tensile, elongation, and morphology) design by controlling the soft and hard segments in the polymer chains. The preparation of polyurethane dispersions is mentioned in the prior art and is known by those skilled in the art of polyurethane formulation through the utilization of various isocyanates and polyols and chain extenders to disperse the polymer in aqueous media. High abrasion resistance, superior toughness, elastic properties and high extensibility at low temperature are typical benefits for many surface coating and adhesive applications including heat seal coatings. However, the very same toughness and chemical resistance make such dispersions difficult to clean up and easily clog up anilox cells, thus resulting in poor press runnability. In heat seal blister coating applications, the medium heat activation temperature range of 170° F. to 240° F. (76° C. to 116° C.) also causes these polyurethanes to exhibit tackier surfaces even after proper drying, creates blocking issues right off the press (stacking on top of one another) as well as during storage and transportation. The higher raw material cost as compared to ethylenic copolymer dispersions and emulsions such as acrylic copolymer systems also restricts its broader use in many industrial applications.

The term "ethylenic copolymers" dispersions or emulsions encompasses copolymers derived from the emulsion polymerization of monomers and includes ethylenic monomers, vinyl monomers, esters of acrylic acids and methacrylic acid, and $\alpha,\beta$-ethylenically unsaturated carboxylic acids etc., as mentioned in the prior art and as known by those skilled in the art of ethylenic copolymers formulation. These copolymer dispersions provide very good press runnability due to their semi-dry film formation and can be easily re-dispersed by its own dispersion, without clogging, and provide a tack free surface by the proper selection of blends of soft and hard copolymers as described in the prior art. However, these copolymers suffer from poor adhesion to the very plastics used in blister packaging, especially RPET, APET, virgin PET, PETG, and GAG.

The present invention discloses a waterborne dispersion composition having significant utility as a heat seal coating for blister packaging applications comprising A) 10% to 90% by weight of one or more polyurethane dispersions, B) 90% to 10% by weight of one or more compatible ethylenic copolymer dispersion/emulsions, C) an anti-blocking additive at 0.1 to 12 weight % of the total solid, and optional additives, including wetting, defoaming, thickening, and antifungal additives; and that the shear storage modulus, G', of the dried film at heat seal activation temperature range (from 170° F. to 240° F.) is tailored to be in the range of $3.5 \times 10^4$ to $6.0 \times 10^5$ Pascals. The weight ratio between A and B, based on the solid resins, is in the range of 15/85 to 85/15. The heat seal coating compositions of the invention provide enhanced and balanced properties such as a reduction of organic solvents, a tack free coating surface off the press, good press runnability, easy clean-up, anti-blocking from ambient temperature to 50° C., heat-activation with no pot life at elevated temperature, and heat sealability to various plastic substrates including virgin poly(ethylene terephthalate) (PET), recycled PET (RPET), amorphous PET (APET), PET-glycol modified (PETG), PETG/APET/PETG (GAG) and polyvinyl chloride (PVC).

It has been found that there is a synergistic effect by blending a polyurethane dispersion and a compatible ethylenic copolymer dispersion/emulsion for a heat seal coating. The term "compatible" means that there is no significant viscosity build up or coagulation, crosslinking or significant loss of film transparency immediately, or after normal storage conditions. With compatible blends, both the adhesion to blister plastics derived from the polyurethane dispersion component and the press runnability and easy to clean features from the copolymers are maintained as compared to the individual polymers when evaluated for a blister heat seal application. The film formation for the blend is also improved, even when a high Tg copolymer is used, since the polyurethane also impart its film forming capability. The inclusion of anti-blocking additives to the blend composition is crucial to allow the use of a softer copolymer dispersion and/or a softer polyurethane dispersion; to extend the applicable range of Tg for the copolymers as well as the applicable melting point or softening point range for the polyurethane dispersion; and to maintain a high level of block resistance as required by blister applications. Optional additives can be used, such as wetting agents, defoaming thickeners, and antifungal additives, as known by those skilled in the art of aqueous dispersion formulation.

During the heat seal step (activation temperature of the coating film from 170° F. to 240° F.), the heat seal coating film has to be soft enough to gain the mobility to flow into the mating substrate to create maximum contact and also has to be strong enough during the cooling immediate after releasing from the seal jars to hold the 2 substrates together through the process. Storage modulus such as shear storage modulus (G') is an useful measurable indication of such physical properties described above. It is, therefore, crucial to define the shear storage modulus values of the heat seal coating film in the heat seal activing temperature range to achieve desired heat seal performance. It is our finding that it is important to tailor the shear storage modulus of the dried film of the composition to be in the range of $3.5 \times 10^4$ to $6.0 \times 10^5$ pascals in heat seal activation temperature range from 170° F. to 240° F. for the heat seal application. This shear storage modulus is also an inherent properties of the individual polyurethane dispersion (component A) and compatible ethylenic copolymer dispersion/emulsion (component B); and therefore, it can be expected that by determining or knowing the G' values of the dried film of the individual dispersion or emulsion at heat seal activation temperature range (from 170° F. to 240° F.), one can estimate/calculate the G' values of the mixtures in the same temperature range based on their weight ratio. Conversely, one can also expect to estimate the needed weight ratios among these polyurethane and compatible ethylenic copolymer dispersion/emulsion to achieve the target G' values at heat seal activation temperature range (from 170° F. to 240° F.) to be in the range of $3.5 \times 10^4$ to $6.0 \times 10^5$ Pascals. This also means that the G' values at heat seal activation temperature range (from 170° F. to 240° F.) for individual dispersion/emulsion can fall outside of the range of $3.5 \times 10^4$ to $6.0 \times 10^5$ Pascals since one can use the blend ratio to bring the resulting G' value of the blend into the targeted range.

It is also reasonable to expect that hybrid dispersion blends of the polyurethane and ethylenic copolymers will have the same synergistic outcome. A hybrid blend can be achieved by one of the two ways: 1) By polymerization of one polymer in present of the other polymer to form a interpenetrating network through single or multi-stage polymerization, or 2) by including a type of monomer/prepolymer carrying a functional group that can react into the other polymer chains, such as a hydroxyl-carrying copolymer grafted on the polyurethane chain.

The heat activation temperature range for blister applications is from 170° F. to 240° F. (76° C. to 116° C.) and the block resistance temperature is 120° F. (50° C.). The selection guideline for both the copolymers and the polyurethanes is to correlate their Tg, softening point or melting point to the upper limit of this heat seal temperature range. With the use of anti-blocking additives of appropriate melting point, the low limit of the Tg, softening point or melting point of the copolymer or the polyurethane dispersion can then be extended to well below 50° C. where the blocking resistance test is conducted.

Suitable polyurethane dispersions should have their melting point or softening point in the range of −30° C. to 120° C., preferably in the range of −25° C. to 110° C., and more preferably in the range −15° C. to 100° C. and to have inherent adhesion to various plastics. The polyurethane dispersions include, but are not limited to the products from Royal DSM N.V. (Neorez® R-551, R-563, R-600, R-1400, R-9249, R-9330, and R-9621); from Bayer Material Science A.G. (Dispercoll® U 42, U 53, U 53, U 56, U 4101, U 8755, U XP2643, U XP2682, and U XP2824); From Alberdingk Boley Inc. (U 216, U 3251, U 3700, U 400N, U 4040, U 4101, and U800); Bond Polymers International LLC (Bondthane® UD-104, UD-302, UD-303, UD-312, UD-375, UD-410; other non-self crosslinkable UD products are suitable but contain co-solvent and are not preferred); from Union Specialties Inc. (Unithane® IC-407SF, IC-551NF, IC-555NF, IC-652NF, IC-653NF, IC-807NFJC-850NF, IC-950NF, IC-951NF, IC953CD, 9717, 9787, XL-2945, and XL-2899); from Essential Polymers (R4300, R4310, R4370, R4388, R4400, R4560, ALU081, R4100, R4188, R4196, R4242, R4584, and R9010); and from C. L. Hauthaway & Sons Corp. (Hauthane® L-2875, L-2877, L-2882, L-2892, L-2896, L-2942, L-2969, L-3101, HD-2001, HD-3011, HD-4664, HD-4669, and HD-4675). The major blister plastic adhesion property is expected to, but not limited to, come mainly from the polyurethane dispersion.

A suitable ethylenic copolymer dispersion is selected to have its glass transition temperature, Tg, in the range of −30° C. to 130° C., preferably in the range of −20° C. to 120° C. and more preferably in the range of −10° C. to 110° C. The styrene monomer content in the copolymers should be less than 80% by weight, and preferably less than 50%. The ethylenic copolymer dispersion can be selected from the materials from BASF Corporation (Joncryl® 1674, 8211, 9010, 9012, 9022, 9030, 1665, and 750); from Alberdingk Boley (AC 548, AC 2310, and Ac 2389); and from copolymer dispersions as mentioned in the prior art.

Exemplary anti-blocking additives are selected from waxes or inorganic particles. Suitable waxes (in either micronized form or aqueous paste) have a melting point higher than 60° C. so as not to create blocking issue in the 50° C. blocking test, more preferably above 80° C., and most preferably above 100° C. In particular, polyethylene, and oxidized polyethylene waxes provide anti-block and slip properties without interfering with the heat seal performance. The anti-blocking additive is used in the range of 0.1 to 12 weight % of the total solids, in particularly 0.5% to 8% and more particularly 1% to 5%. Appropriate anti-blocking additives include, but are not limited, to waxes from BYK Additives & Instruments (Aquacer® 1547, 8026, 8032, 8052, 8059, 8592, Aquamatt® 208, 263, Ceraflour® 929, 950); from The Lubrizoil Corporation (Liquitron® 442, 4405GA, CEX4640, Pinnacle® 1610, 1993); and from Micropowders Inc. (Aquapoly® 215, 225, AquaTex® 270, 325, Aquamatte® 31). Suitable inorganic includes but not limited to materials like silica (Syloid® ED3, Ludox® AM, AD30 (from W. R. Grace and Company); and Aerodisp 750 (from Evonik Industries AG).

Optional additives including wetting, defoaming, thickener, antifungal additives are commonly used to improve runnability and stability of the coating composition and are known by those skilled in the art of aqueous dispersion formulation.

The aqueous heat seal coating composition of the invention can be applied through a flexographic (flexo) coater from a flexo press or from a lithographic (offset) press at the end of the press, through a roller coater or through a gravure coater onto the printed blister boards. The aqueous heat seal coating can either be applied either in-line or off-line with the printing steps and drying with the dryer designed for the press. The heat seal coating is applied on the clay coated side of the blister board to prevent excessive dive-in and at appropriate coat weight, 0.25 to 0.8 lb/MSF (pounds per thousand square feet) or 1.22 to 3.91 gm/m² (gsm), enough to bond the blister plastics.

The viscosity of the heat seal coating composition of this invention is in the range of 80 to 600 centipoises (cps) measured with a Brookfield Viscometer model LV using an appropriate spindle for the device (#2 or #3 spindle depending on the viscosity) and at appropriate spindle speed (10 to 100 rpm) at 25° C., preferably in the range of 150 to 600 cps and more preferably in the range of 200 to 400 cps as known by people skill in the art of formulating aqueous coating for the application methods mentioned above. The percent solid of the coating composition of this invention is in the range of 20% to 60%, particularly in the range of 25% to 50%, more particularly in the range of 35% to 45%.

The heat seal process for the coating composition in this invention is performed using heating jaws to reach the heat activation temperature is in the range of 170° F. to 240° F. (76° C. to 116° C.) at the coating interface by properly adjusting the temperature setting, pressure, and dwell time of the jaws. The heat is transmitted from the non-coated side of the backing (blister board), through the backing, to the coating/blister plastic interface.

EXAMPLES

The following parameters are applicable to the examples presented herein:

Viscosity—Viscosity was measured with a Brookfield Viscometer model LV with an appropriate spindle and rpm at 25° C. or a specified temperature per manufacturer instructions.

Percentage solid: EPA method 24 and theoretical calculations based on the solid of each raw material is used to determine the solid percentage of the water based coating composition.

Heat Sealing: A Lab heat sealing unit from Packaging Industries, Inc., Model 12A9 was used to perform sealing of the blister card to blister plastics; heat is transmitted through the card to the coating-plastic interface. The setting conditions were 345° F. (174° C.), 80 psi, for 2 seconds to achieve the coating activation temperature of 200° F. (93° C.) which was determined by an 8-temperature indicator label (170° F. to 240° F.) from the Paper Thermometer Company. If adjustment is required, the temperature setting was changed while keeping the pressure and dwell time the same.

Drying: After the coating was applied to the C1S blister board, a blister Blue M oven was used to dry the coating at 100° C. for 10 seconds.

Block Resistance: The blocking test is performed for a face to back (coated side to uncoated side) orientation under 1 pound per square inch (psi) at 50° C. for 24 hours. The block resistance is rated from 1 to 5: 5: Excellent: Falls apart easily; 4: Good: Slight cling, No picking, very light or no force separating; 3: OK: No picking, slight force separating; 2: Some paper picking; and 1: Bad: Fiber tearing.

Shear storage modulus curve determination: TA instrument RDA model ARES G2 was used in generating the shear storage modulus cure. 8 mm or 25 mm parallel plate geometry was used to conduct the temperature sweep run on RDA instrument from 0° C. to 150° C. at 5° C./minutes ramp rate, at angular frequency of 10 rads/sec., and under auto-tension and auto-strain mode. A sample film was prepared by casting about 4 to 5 grams of a wet sample on a releasable silicone rubber cup with diameter of 5 cm. The filled cup is then put in 50° C. oven for 24 hours followed by applying vacuum at 50° C. for another 24 hours to remove residual water in the film. The achieved dried film is about 0.8 to 1.5 mm thick. Once the shear modulus curve is generated, the modulus at 170° F. (77° C.) and at 240° F. (116° C.) are recorded for comparison.

Examples 1 to 4 and Comparative Examples 1 and 2

TABLE 1

Heat Seal Coating Compositions of Examples 1 to 4 and Comparative Examples 1-2

| Ingredient | Class | Comparative Example 1 | Example 1 | Example 2 | Example 3 | Comparative Example 2 | Example 4 |
| --- | --- | --- | --- | --- | --- | --- | --- |
| Joncryl 750 (BASF) | Ethylenic Copolymer dispersion | 85.90 | 76.00 | 38.00 | 11.00 | N/A | 10.00 |
| H2O | Distill water | 10.00 | N/A | N/A | N/A | N/A | N/A |
| Foam-A-Tac 617 (ESP Specialty Products, Inc) | Defoamer | 0.30 | 0.30 | 0.30 | 0.30 | 0.30 | 0.30 |

TABLE 1-continued

Heat Seal Coating Compositions of Examples 1 to 4 and Comparative Examples 1-2

| Ingredient | Class | Comparative Example 1 | Example 1 | Example 2 | Example 3 | Comparative Example 2 | Example 4 |
|---|---|---|---|---|---|---|---|
| R4242 (Essential Polymer) | Polyurethane dispersion | N/A | 20.10 | 58.20 | 84.20 | 95.00 | 82.00 |
| ACRYSOL RM-8W (Dow Chemical Company) | Rheology modifier | 0.30 | 0.10 | N/A | 1.00 | 1.20 | 1.20 |
| CEX4640 (Lubrizoil) | Oxidized Polyethylene wax | 2.00 | 2.00 | 2.00 | 2.00 | 2.00 | 5.00 |
| Sodium Dioctyl Sulfosuccinate (DOSS) 70% in Propylene Glycol (Midwest Graphic Sales, Inc.) | Wetting additive | 1.50 | 1.50 | 1.50 | 1.50 | 1.50 | 1.50 |
| Total | | 100.00 | 100.00 | 100.00 | 100.00 | 100.00 | 100.00 |
| % Solid | | 45.1 | 46.7 | 40.3 | 35.5 | 33.6 | 35.5 |
| % PU Solid per Solid Resins | | 0.0% | 14.9% | 50.3% | 83.5% | 100.0% | 84.5% |
| % Wax Solid of Total Solid | | 1.78% | 1.71% | 1.99% | 2.26% | 2.38% | 6.64% |
| Viscosity, cps | | 242 | 272 | 333 | 195 | 208 | 278 |

The components of the example compositions in accordance with the present invention were prepared by adding the acrylic copolymer dispersion(s) and defoamer in a high density polyethylene plastic container of proper size and adding the remaining ingredients one at a time while mixing with a saw-tooth mixing blade at a medium speed 700 rpm. The whole composition was then mixed for 30-60 minutes to reach a stable viscosity. When a rheology modifier was used, the recommended mixing time was 60 minutes. The viscosity was measured with a Brookfield Viscometer model LV with a #2 spindle at 60 rpm and 25° C. The listed percentage solid, % polyurethane (PU) solids per solid resins (polyurethane resin plus acrylic copolymer resin solids), and percent solid wax per total solids were calculated from the solids of each ingredient and all percentages used are by weight percentage.

Each coating composition was then applied with a #4 wire wound rod onto the coated side of a 20 caliper 1 side coated Candesce® blister board from Clearwater Paper Corporation and dried in a 120° C. oven for 10 seconds.

Heat seal performance for the compositions from Table 1 were based on sealing to various blister plastics provided by converters at 345° F., 80 psi for 2 seconds using a lab heat sealer as described above to reach an interface temperature of 200° F. (93° C.). The plastics dimension was 2.5 inches by 0.5 inch and each sealed strip was then cut into 6 small strip for a hand peel test and the peel results rated by the failure mode. The most idea failure mode was a 100% fiber tearing (FT) of the blister board and in general a FT mode over 85% may be acceptable, depending on the converter's specification. Other undesirable failure modes includes "pop" (the blister plastic pops off the heat seal coating indicating bad plastic adhesion), "clay split" (the clay coating is pulled off from the blister board without causing fiber tear; indicating poor penetration and bond strength), and ink split (inks has poor cohesive strength; not applicable in this case since no ink in used). The results of the heat seal tests for heat seal coating compositions from Table 1 are listed in Table 2 below, expressed by consideration of the area % of each failure mode.

An "Ease of clean" evaluation was performed by applying the coating composition using a wire wound rod #10 on a clean glass plate, letting it blow dry to dried for about 20 second to have a semi-dried film, and then rubbing the film with a 50/50 blend of isopropyl alcohol and water. The evaluation is rated as follows: 1. Easy to re-disperse without any visible, insoluble film/particles; 2. Medium easy with no or few difficult to view insoluble film/particles; 3. Hard to re-disperse with visible and insoluble film/particles which would cause clogging of anilox cells and be difficult to cleanup on a press). The results are also listed in Table 2.

Table 2 also includes one comparative example 3 of an all polyurethane dispersion and one comparative example 4 of an all acrylic copolymer dispersion.

TABLE 2

Heat Seal, Ease of Clean & Block Evaluation Results for Table 1 Compositions

| Examples | Blister Plastic Type | | | | | Ease of Clean | Block Resistance Rating |
|---|---|---|---|---|---|---|---|
| | RPET | APET | PETG | GAG | PVC | | |
| Comparative Example 1 (Acrylic Copolymer Dispersion) | 60-40% FT; 40-60% Pop | 79% FT; 5% Pop; 16% Clay Split | 92% FT; 8% Pop | 80% FT; 20% Pop | 100% FT | Easy re-disperse | 2, some picking, strong force |

TABLE 2-continued

Heat Seal, Ease of Clean & Block Evaluation Results for Table 1 Compositions

| Examples | Blister Plastic Type | | | | | Ease of Clean | Block Resistance Rating |
| --- | --- | --- | --- | --- | --- | --- | --- |
| | RPET | APET | PETG | GAG | PVC | | |
| Example 1 | 95% FT; 5% Pop | 100% FT | 95% FT; 5% Clay Split | 84% FT; 16% Clay Split | 100% FT | Easy re-disperse | 2-3, slight picking, medium force |
| Example 2 | 100% FT | 100% FT | 100% FT | 100% FT | 100% FT | Medium easy re-disperse | 3, No picking, slt force |
| Example 3 | 100% FT | 100% FT | 100% FT | 100% FT | 100% FT | Medium easy re-disperse | 3, No picking, slt force |
| Comparative Example 2 (Polyurethane Dispersion) | 100% FT | 100% FT | 100% FT | 100% FT | 100% FT | Hard to re-disperse, insoluble | 3, No picking, slt force (Without wax: 2, some picking) |
| Example 4 | 100% FT | 100% FT | 100% FT | 100% FT | 100% FT | Medium easy re-disperse | 5, Fall apart |
| Comparative Example 3 (Polyurethane Dispersion) | 100% FT | 100% FT | 100% FT | 100% FT | 100% FT | Very Hard to re-disperse, insoluble | 1, fiber tearing |
| Comparative Example 4 (Acrylic Copolymer) | 70-60% FT; 30-40% Pop; slt Corner lift | 80% FT; 20% Pop | 80% FT; 20% Pop | 90% FT; 10% Pop | 100% FT | Easy re-disperse | 2-3, some picking, medium force |

FT: Fiber tear;
Slt slight

All the heat seal coating compositions from Table 1 and Table 2 have good heat seal to PVC blister plastic, however, PVC plastics are being gradually faced out of the marketplace globally due to their environmental impact in depleting the earth's ozone layer. The heat seal performance over other blister plastics, on the other hand, is drastically different. Acrylic copolymer dispersion coating compositions, Comparative examples 1 and 4, show poor heat seal adhesion over RPET, APET and either PETG or GAG. Their block resistance rating is marginal, even though they can be further improved by a proper anti-block resistant additive. Both examples, as expected, have good re-solubility and thus are expected to have good press runnability and easy cleanup properties.

Polyurethane dispersion coating compositions, Comparative Examples 2 and 3, exhibit excellent heat seal adhesion to all the plastics tested as might be expected and they are more difficult to clean up due to their excellent film property and therefore will cause clogging of anilox cells which makes it difficult to maintain a consistent coat weight in longer press runs. Comparative Example 3 has a poor block resistant rating of 1, which causes undesirable fiber tearing and problems in press runs and handling afterwards. Comparative Example 2 has good block resistance with an anti-blocking additive as specified in this disclosure, while having marginal block resistance if an anti-blocking additive is not used.

Polyurethane dispersions and acrylic copolymer dispersions normally do not have good compatibility for various reasons, such as but not limited to, their respective chemical structures, functional group interactions, the amine extenders used, and their morphology. The most frequent results of the incompatibility are gel structure formation and hazy film formation. Example 1, 2, 3 utilize compatible polyurethane dispersions and acrylic copolymer dispersions, with solid PU % at 15%, 50% and 84% per solid resin along with an oxidized polyethylene anti-blocking additive at 1.7 to 2.4% as specified. The resulting synergistic effect for heat seal blister plastic adhesion as compared to pure acrylic copolymers, ease of clean up as compared to pure polyurethane dispersions, and anti-block resistance are achieved as demonstrated in Table 2. Even when the specified anti-blocking additive is doubled, as in Example 4, the heat seal properties to all the blister plastics tested remained at 100% fiber tearing bond performance, while block resistance reached the highest 5 rating (fall apart between sheets). Better economic value by incorporating an acrylic copolymer dispersion is also realized.

To further demonstrate the synergistic performance of the heat seal coating compositions from this invention, Examples 5 to 9 below utilize harder or softer compatible polyurethane dispersions and acrylic copolymer dispersions than those from Examples 1 to 4. Heat seal blister plastic adhesion, ease of cleaning, (better runnability), anti-block resistance, as well as better economics are achieved as demonstrated in Table 4. The heat seal performance for virgin PET is the same or better than for the prior examples.

TABLE 3

Heat Seal Coating Compositions of Examples 5 to 9

| Ingredient | Class | Example 5 | Example 6 | Example 7 | Example 8 | Example 9 |
|---|---|---|---|---|---|---|
| Joncryl 750 (BASF) | Ethylenic Copolymer dispersion | — | — | — | 28.00 | 37.50 |
| Joncryl HSL9012 (BASF) | Ethylenic Copolymer dispersion | 60.00 | 35.00 | — | 10.00 | — |
| AC 548 (Alberdingk Boley) | Ethylenic Copolymer dispersion | — | — | 35.40 | — | — |
| Foam-A-Tac 617 (ESP Specialty Products, Inc) | Defoamer | 0.30 | 0.30 | 0.30 | 0.30 | 0.30 |
| R4242 (Essential Polymer) | Polyurethane dispersion | — | — | — | 57.70 | 48.20 |
| ALU081 (Essential Polymer) | Polyurethane dispersion | 33.20 | — | 57.00 | — | 10.00 |
| Dispercoll ® U 4101 (Bayers Material Science) | Polyurethane dispersion | — | 57.20 | — | — | — |
| ACRYSOL RM-8W (Dow Chemical Company) | Rheology modifier | N/A | 1.00 | 0.80 | 0.50 | 0.50 |
| CEX4640 (Lubrizoil) | Oxidized Polyethylene wax | 5.00 | 5.00 | 5.00 | 2.00 | 2.00 |
| Sodium Dioctyl Sulfosuccinate (DOSS) 70% in Propylene Glycol (Midwest Graphic Sales, Inc.) | Wetting additive | 1.50 | 1.50 | 1.50 | 1.50 | 1.50 |
| Total | | 100.00 | 100.00 | 100.00 | 100.00 | 100.00 |
| % Solid | | 37.6 | 39.9 | 39.9 | 39.1 | 40.1 |
| % PU Solid per Solid Resin | | 31.9% | 62.6% | 51.5% | 51.5% | 50.6% |
| % Wax of Total Solid | | 5.31% | 5.01% | 5.02% | 2.05% | 2.00% |
| Viscosity, cps | | 750 | 261 | 345 | 200 | 225 |

TABLE 4

Heat Seal, Ease of Cleaning, and Block Evaluation Results for Table 3[AL1] Compositions

| Examples | Blister Plastic Type | | | | | Ease of Clean | Block Resistance Rating |
|---|---|---|---|---|---|---|---|
| | RPET | APET | PETG | GAG | PVC | | |
| Example 5 | 100% FT | 100% FT | 100% FT | 100% FT | 100% FT | Easy re-disperse | 2-3, slight picking, medium force |
| Example 6 | 100% FT | 100% FT | 100% FT | 100% FT | 100% FT | Medium easy re-disperse | 3, No picking, slt force |
| Example 7 | 100% FT | 100% FT | 100% FT | 100% FT | 100% FT | Medium easy re-disperse | 3, No picking |
| Example 8 | 100% FT | 100% FT | 95% FT; 5% Clay Split | 100% FT | 100% FT | Medium easy re-disperse | 3, No picking |
| Example 9 | 100% FT | 100% FT | 100% FT | 100% FT | 100% FT | Medium easy re-disperse | 3, No picking |

The annexed FIGURE shows the shear storage modulus curves generated from the RDA instrument under the conditions specified for five of the dispersions, including two ethylenic copolymer emulsions/dispersions and three polyurethane dispersions. The two solid lines outline the activation heat seal temperature at 170° F. (77° C.) and at 240° F. (116° C.) and the two dotted lines outline the targeted shear modulus range for the heat seal coating composition, i.e. 3.5×104 to 6.0×105 Pascals. Table 5 records the corresponding G' values at 170° F. (77° C.) and at 240° F. (116° C.) for each dispersion. One can see that only IC556NF and HSL9012 have G' values within 3.5×104 to 6.0×105 Pascals at a temperature range from 77° C. to 116° C., while R4242 well above the range, Joncryl 750 is slightly below the range and U-54 is well under the range at the same temperature range.

TABLE 5

Shear Storage Moduli for individual dispersion/
emulsion at 170° F. and 240° F.

| | | Shear Storage modulus G' (pascals) | |
|---|---|---|---|
| Ingredient | Chemistry | G' at 170° F. (77° C.) | G' at 240° F. (116° C.) |
| Joncryl HSL9012 | Ethylenic Copolymer Dispersion | $3.2 \times 10^5$ | $7.2 \times 10^4$ |
| Joncryl 750 | Ethylenic Copolymer Dispersion | $1.2 \times 10^5$ | $2.1 \times 10^4$ |
| IC556NF | Polyurethane Dispersion | $6.4 \times 10^5$ | $1.9 \times 10^5$ |
| R4242 | Polyurethane Dispersion | $3.4 \times 10^6$ | $4.5 \times 10^5$ |
| U54 | Polyurethane Dispersion | $6.7 \times 10^4$ | Too flowable and can not be measured |

Despite that only two individual dispersions with G' values fall within a $3.5 \times 10^4$ to $6.0 \times 10^5$ Pascals range at a heat seal activation temperature range of 170° F. (77° C.) to 240° F. (116° C.), the examples below not only demonstrate how we can utilize the blend ratio to tailor to this target shear modulus range but also show the correlation of the target range of shear storage modulus to the quality of seal.

Table 6 shows the shear storage moduli of the heat seal coating compositions as outlined in Table 1 (their seal performance in Table 2) and Example 10.

TABLE 6

Shear Storage Moduli for Examples showed in Table 1.

Target Shear Storage Modulus Range (pascals): $6.0 \times 10^5$ to $3.5 \times 10^4$

| | | G' at 170° F. (77° C.) | G' at 240° F. (116° C.) | Seal Quality |
|---|---|---|---|---|
| Comparative Example 1 | Ethylenic Copolymer Dispersion | $1.5 \times 10^5$ | $2.1 \times 10^4$ | poor seal (too soft) |
| Example 1 | Joncryl 750/R4242 blend = 79.1/20.9 by wt ratio | $7.0 \times 10^5$ | $1.2 \times 10^5$ | almost perfect seal |
| Example 2 | Joncryl 750/R4242 blend = 39.5/60.5 by wt ratio | $2.3 \times 10^6$ | $2.7 \times 10^5$ | perfect seal |
| Example 3 | Joncryl 750/R4242 blend = 11.6/88.4 by wt ratio | $3.1 \times 10^6$ | $3.9 \times 10^5$ | perfect seal |
| Comparative Example 3 | Polyurethane Dispersion | $1.7 \times 10^5$ | $4.0 \times 10^4$ | perfect seal, but hard to clean |
| Example 5 | Joncryl HSL9012/ALU081 = 64.4/35.6 by wt ratio | $5.5 \times 10^5$ | $1.3 \times 10^5$ | perfect seal and good cleaning |
| Example 10 | Joncryl 750/U-54 = 11.6/88.4 wt ratio | $7.2 \times 10^4$ | $2.1 \times 10^3$ | too soft and less than 60% FT in most cases |

Example 10: same formula as Example 3 but substitute R4242 (high G') with U-42 (lowest G')

Note that the detailed seal quality information for the examples in Table 6 can be found in Table 2. For Comparative Example 1 based on Joncryl 750 ethylenic copolymer dispersion, its G' at 240° F. is lower than $3.5 \times 10^4$ Pascals and the material is too soft during the heat seal step and could not regain the film strength fast enough after the heating jar pressure is off and thus resulted in poor quality of seal quality. Examples 1, 2, and 3 are different among them by varying the ratio between ethylenic copolymer emulsion, Joncryl 750 (lower G' value at 240° F.; softer material) and the polyurethane dispersion, R4242 (higher G' at 170° F.; stiffer material). Example 1 has slightly higher G' at 170° F. and achieved almost perfect seal quality while Example 2 and 3 have G' values within the target shear storage modulus range between 170° F. and 240° F. and showed perfect seal quality and appropriate film strength behavior. By blending these two emulsions together, we are able to not only achieve the synergistic effect as mentioned earlier but also tailor desired physical strength required to go through the heat seal cycle. Comparative Example 3 and Example 5 both have G' values within the target shear storage modulus range between 170° F. and 240° F. and showed perfect seal quality except that Comparative Example 3 is use all polyurethane dispersion and thus has inherent clean-up problem. Example 5 are formulated with HSL9012 and ALU081 and such composition also exhibits good seal quality and G' values within the target range between 170° F. and 240° F. Example 10 is the same as Example 3 except using softer U-54 (lower end of the G' value even at 170° F. and G' does not even registering at 240° F.). Example 10 has poor seal quality mainly due to poor physical strength at the heat seal process resulting from softer emulsions of Joncryl 750 and U-54.

The use of anti-blocking additives in the present invention has broadened the selection of polyurethane dispersions and acrylic copolymer dispersions in heat seal coating compositions; both softer polyurethane dispersions and softer acrylic copolymer dispersions can be used while still having proper block resistance as required in blister coating applications. The incorporation of a polyurethane dispersion in the heat seal coating compositions of this invention provides a coating film toughness and adhesion to various plastics (RPET, Virgin PET, APET, PETG, GAG, and PVC), while harder acrylic copolymer dispersions and harder polyure-
thane dispersions can be used at the same time without scarifying the flexibility of the resulting dry coating.

The examples above have demonstrated the synergistic effect and benefits in heat seal blister coating applications by a blend of A) 10% to 90% by weight of one or more polyurethane dispersions; B) 90% to 10% by weight of one or more compatible ethylenic copolymer dispersions/emulsions; C) an anti-blocking additive at 0.1 to 12 weight % of the total solids; and D) optional additives including wetting, defoaming, thickener, and antifungal additives. It is also crucial that the shear storage modulus, G', of the dried film at heat seal activation temperature range (from 170° F. to 240° F.) are tailored to be in the range of $3.5 \times 10^4$ to $6.0 \times 10^5$ Pascals to ensure best heat seal success. It is even more preferable to have the heat seal blister coating composition comprised of A) 20% to 80% by weight of one or more polyurethane dispersions; B) 80% to 20% by weight of one or more compatible ethylenic copolymer dispersions/emulsions and having the shear storage modulus, G', of the dried film at heat seal activation temperature range (from 170° F. to 240° F.) tailored to be in the range of $3.5 \times 10^4$ to $6.0 \times 10^5$ Pascals. A weight ratio between A and B based on the solid resin content is in the range of 15/85 to 85/15. As can be reasonably expected by those in the skilled in the art, a hybrid blend of the polyurethane and acrylic copolymers, with polymerizing of one resin dispersion in the presence of the other resin dispersion or grafting onto one another can achieve the same synergistic effect.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A film forming aqueous dispersion coating composition having utility as a heat seal coating for blister packaging applications comprising:
   A) 10% to 90% by weight of one or more polyurethane dispersions having a melting point when dried in the range of −30° C. to 120° C.;
   B) 90% to 10% by weight of one or more compatible ethylenic copolymer dispersions;
   C) an anti-blocking additive at 0.1-12 weight % of total solids; and
   D) optionally one or more wetting, defoaming, thickener, or antifungal additives;
   the heat seal coating when dried having a shear storage modulus G' at a heat seal activation temperature range of 170° F.-240° F. in the range of $3.5 \times 10^4$ to $6.0 \times 10^5$ Pascals; the ethylenic copolymer dispersion having a glass transition temperature Tg in the range of −30° C. to 130° C.

2. The film forming aqueous dispersion coating composition of claim 1 wherein a solid resin weight ratio between A and B is in a range of 15/85 to 85/15.

3. The film forming aqueous dispersion coating composition of claim 1, wherein the ethylenic copolymer dispersion comprises a styrene monomer content of less than 80% by weight.

4. The film forming aqueous dispersion coating composition of claim 1, wherein the anti-blocking additive is selected from waxes or inorganic particles.

5. The film forming aqueous dispersion coating composition of claim 4 wherein the wax is in a micronized form or is an aqueous paste and has a melting point higher than 60° C. and is present in a range of 0.1 to 12 weight % of total solids.

6. The film forming aqueous dispersion coating composition of claim 1, wherein the one or more polyurethane dispersions has a melting point or softening point in the range of −25° C. to 110° C.

7. The film forming aqueous dispersion coating composition of claim 6, wherein the one or more polyurethane dispersions has a melting point of −15° C. to 100° C.

8. The film forming aqueous dispersion coating composition of claim 1, wherein the ethylenic copolymer dispersion has a glass transition temperature, Tg, in the range of −20° C. to 120° C.

9. The film forming aqueous dispersion coating composition of claim 1, wherein the ethylenic copolymer dispersion has a glass transition temperature, Tg, in the range of −10° C. to 110° C.

10. The film forming aqueous dispersion coating composition of claim 3, wherein the styrene monomer content in the copolymer is less than 50% by weight.

* * * * *